US008717327B2

(12) United States Patent
Hering (10) Patent No.: US 8,717,327 B2
(45) Date of Patent: May 6, 2014

(54) CONTROLLING RESPONSIVENESS TO USER INPUTS ON A TOUCH-SENSITIVE DISPLAY (71) Applicant: Nokia Corporation, Espoo (FI)

(72) Inventor: Jean-Marc Hering, Naantali (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/050,992

(22) Filed: Oct. 10, 2013

(65) Prior Publication Data

US 2014/0035873 A1 Feb. 6, 2014

Related U.S. Application Data (62) Division of application No. 13/179,124, filed on Jul. 8, 2011.

(51) Int. Cl.
*G09G 5/00* (2006.01)

(52) U.S. Cl.
USPC ............................. 345/173; 345/156; 715/863

(58) Field of Classification Search
USPC ........ 345/156, 173–179; 178/18.01; 455/566; 715/815, 823, 863
See application file for complete search history.

(56) References Cited

U.S. PATENT DOCUMENTS

| 6,813,344 | B1 | 11/2004 | Lemke |
| 7,047,005 | B2 | 5/2006 | Kinnavy |
| 7,884,807 | B2 * | 2/2011 | Hovden et al. ................ 345/173 |
| 8,259,080 | B2 * | 9/2012 | Casparian et al. ............ 345/173 |
| 8,352,884 | B2 * | 1/2013 | Zalewski et al. .............. 715/864 |
| 8,364,208 | B2 * | 1/2013 | Choi et al. .................... 455/566 |
| 2003/0034185 | A1 | 2/2003 | Kaikuranta |
| 2004/0085351 | A1 | 5/2004 | Tokkonen |
| 2006/0082556 | A1 | 4/2006 | Baker et al. |
| 2006/0087993 | A1 | 4/2006 | Sengupta et al. |
| 2007/0026371 | A1 * | 2/2007 | Wood ............................ 434/317 |
| 2007/0109276 | A1 * | 5/2007 | Kim et al. .................... 345/173 |
| 2007/0150842 | A1 | 6/2007 | Chaudhri et al. |
| 2007/0152976 | A1 | 7/2007 | Townsend et al. |
| 2008/0093130 | A1 | 4/2008 | Lee et al. |
| 2008/0150911 | A1 * | 6/2008 | Harrison ....................... 345/173 |
| 2009/0153438 | A1 * | 6/2009 | Miller et al. ................... 345/55 |

(Continued)

FOREIGN PATENT DOCUMENTS

EP 1 659 481 A2 * 5/2006
EP 2 077 490 A2 * 8/2009

OTHER PUBLICATIONS

Office Action for U.S. Appl. No. 13/179,124; dated Aug. 5, 2013.
Office Action for U.S. Appl. No. 13/179,124; dated Dec. 6, 2013.

*Primary Examiner* — Joe H Cheng
(74) *Attorney, Agent, or Firm* — Alston & Bird LLP (57) ABSTRACT A communications terminal comprises a and a touch-sensitive display for displaying content generated by a software application associated with the processor and for receiving touch-based interactions for use with said software application. A display controller is operable to selectively accept and reject touch-based interactions in one or more predetermined sub-region(s) of the touch-sensitive display. Interactions in said sub-region(s) are rejected in response to said software application being woken from an idle state by an event triggered independent of user interaction and subsequently accepted in response to a predetermined event, for example by user action in an active zone outside of the sub-region(s).

9 Claims, 8 Drawing Sheets

(56) References Cited

U.S. PATENT DOCUMENTS

| | | |
|---|---|---|
| 2009/0262078 A1 | 10/2009 | Pizzi |
| 2009/0305732 A1 | 12/2009 | Marcellino et al. |
| 2009/0307519 A1 | 12/2009 | Hyatt |
| 2010/0067723 A1 | 3/2010 | Bergmann et al. |
| 2010/0295559 A1 | 11/2010 | Osoinach |
| 2010/0302212 A1* | 12/2010 | Weber et al. .................. 345/178 |
| 2011/0069021 A1 | 3/2011 | Hill |
| 2011/0081889 A1 | 4/2011 | Gao et al. |
| 2011/0159844 A1 | 6/2011 | Gillet et al. |
| 2011/0307727 A1 | 12/2011 | Wu |
| 2012/0212438 A1* | 8/2012 | Vaisanen ...................... 345/173 |
| 2012/0218282 A1 | 8/2012 | Choboter et al. |
| 2012/0235790 A1 | 9/2012 | Zhao et al. |
| 2012/0249461 A1 | 10/2012 | Flanagan et al. |
| 2012/0254782 A1* | 10/2012 | Van Ieperen et al. ......... 715/765 |
| 2012/0297212 A1 | 11/2012 | Belali et al. |
| 2012/0315929 A1 | 12/2012 | Oshinsky et al. |
| 2013/0234929 A1* | 9/2013 | Libin ........................... 345/156 |
| 2013/0300674 A1* | 11/2013 | Davidson ..................... 345/173 |

* cited by examiner

CONTROLLING RESPONSIVENESS TO USER INPUTS ON A TOUCH-SENSITIVE DISPLAY

CROSS-REFERENCE TO RELATED APPLICATIONS

This application is a divisional of U.S. application Ser. No. 13/179,124, filed Jul. 8, 2011, which is hereby incorporated herein in its entirety by reference.

FIELD

This invention relates to user input control on a touch-sensitive display, particularly the selective rejection of input controls in predetermined sub-region(s) of the display.

BACKGROUND

It is common for data terminals such as mobile telephones, data tablets and PDAs to provide a touch-sensitive display through which a user can interact with software executed on a processor of the terminal.

It is also common for displays to occupy a significant proportion of, and sometimes almost all of, the area available on a given side of the terminal, leaving a relatively thin border of casing surrounding the screen perimeter. Whilst this offers an increased area for displaying and interacting with software applications on the terminal, it can create practical difficulties. In particular, users can unintentionally interact with software applications when holding or picking-up the terminal at its peripheral edges.

SUMMARY

A first aspect of the invention provides apparatus comprising at least one processor and at least one memory having computer-readable code stored thereon which when executed controls the at least one processor:

to cause display of content generated by a software application associated with the processor;

to receive signals indicative of touch inputs on a touch-sensitive display;

to respond to detection of the software application being woken from an idle state by entering a first mode in which touch-based interactions in one or more predetermined sub-regions of the touch-sensitive display are rejected, and whilst in the first mode, to respond to detection of a touch-based interaction without the one or more predetermined sub-regions by exiting the first mode and thereafter to respond to touch-based interactions in said one or more predetermined sub-region of the touch-sensitive display.

The computer code when executed may control the processor to subsequently to accept user interactions in the or each predetermined sub-region in response to receiving user interactions outside of said sub-region(s).

The computer code when executed may control the processor to subsequently to accept user interactions in the or each predetermined sub-region(s) in response to receiving user interactions made through the touch-sensitive display outside of said sub-region(s).

The apparatus may be a communications device, and the computer code when executed may control the processor to be unresponsive to interactions in said sub-region(s) in response to said software application being woken from an idle state by a received telephone call.

The apparatus may be a communications device, the computer code when executed may control the processor to be unresponsive to interactions in said sub-region(s) in response to said software application being woken from an idle state by means of a received data message.

The computer code when executed may control the processor to be unresponsive to interactions in said sub-region(s) in response to said software application being woken from an idle state by means of an internal timer function.

The or each said sub-region may be at the perimeter of the touch-sensitive display. The sub-regions comprise first and second separate sub-regions located on opposite perimeters of the touch-sensitive display.

The apparatus may be a mobile communications terminal.

A second aspect of the invention comprises a method comprising:

causing display of content generated by a software application associated with the processor;

receiving signals indicative of touch inputs on a touch-sensitive display;

responding to detection of the software application being woken from an idle state by entering a first mode in which touch-based interactions in one or more predetermined sub-regions of the touch-sensitive display are rejected, and whilst in the first mode, responding to detection of a touch-based interaction without the one or more predetermined sub-regions by exiting the first mode and thereafter to respond to touch-based interactions in said one or more predetermined sub-region of the touch-sensitive display.

The invention also provides a computer program comprising instructions that when executed by computer apparatus control it to perform the method above.

A third aspect of the invention provides a non-transitory computer-readable storage medium having stored thereon computer-readable code, which, when executed by computing apparatus, causes the computing apparatus to perform a method comprising:

causing display of content generated by a software application associated with the processor;

receiving signals indicative of touch inputs on a touch-sensitive display;

responding to detection of the software application being woken from an idle state by entering a first mode in which touch-based interactions in one or more predetermined sub-regions of the touch-sensitive display are rejected, and whilst in the first mode, responding to detection of a touch-based interaction without the one or more predetermined sub-regions by exiting the first mode and thereafter to respond to touch-based interactions in said one or more predetermined sub-region of the touch-sensitive display.

A fourth aspect of the invention provides apparatus comprising:

means for causing display of content generated by a software application associated with the processor;

means for receiving signals indicative of touch inputs on a touch-sensitive display;

means for responding to detection of the software application being woken from an idle state by entering a first mode in which touch-based interactions in one or more predetermined sub-regions of the touch-sensitive display are rejected, and means for responding, whilst in the first mode, to detection of a touch-based interaction without the one or more predetermined sub-regions by exiting the first mode and thereafter to respond to touch-based interactions in said one or more predetermined sub-region of the touch-sensitive display.

A fifth aspect of the invention provides apparatus comprising at least one processor and at least one memory having computer-readable code stored thereon which when executed controls the at least one processor:

to cause display of content generated by a software application associated with the processor;

to receive signals indicative of touch inputs on a touch-sensitive display; and to respond to detection of a content window provided by the software application being enlarged by entering a first mode in which touch-based interactions in one or more predetermined sub-regions at a perimeter of the touch-sensitive display are rejected.

The computer code when executed may control the processor to reject interactions in said one or more perimeter sub-regions in response to a user interface window associated with the application being enlarged in accordance with a maximise command.

The software application may be configured to control the processor to enlarge the window in response to one or more received touch inputs.

The computer code when executed may control the processor to be responsive to interactions in said one or more perimeter sub-regions in response to a predetermined event.

The computer code when executed may control the processor to be responsive to interactions in said perimeter sub-region(s) in response to user interactions made outside of said one or more perimeter sub-regions.

The computer code when executed may control the processor to be responsive to interactions are subsequently accepted in response to user interactions made through the touch-sensitive display outside of said one or more perimeter sub-regions.

The display may be elongate having opposed lengthwise edges and widthways edges, and the one or more perimeter sub-regions comprise first and second separate sub-regions located on lengthwise, opposite perimeters of the touch-sensitive display.

Therein the apparatus may be a mobile communications terminal.

A sixth aspect of the invention provides a method comprising:

causing display of content generated by a software application associated with the processor;

receiving signals indicative of touch inputs on a touch-sensitive display; and responding to detection of a content window provided by the software application being enlarged by entering a first mode in which touch-based interactions in one or more predetermined sub-regions at a perimeter of the touch-sensitive display are rejected.

The invention also provides a computer program comprising instructions that when executed by computer apparatus control it to perform the method above.

A seventh aspect of the invention provides a non-transitory computer-readable storage medium having stored thereon computer-readable code, which, when executed by computing apparatus, causes the computing apparatus to perform a method comprising:

causing display of content generated by a software application associated with the processor;

receiving signals indicative of touch inputs on a touch-sensitive display; and responding to detection of a content window provided by the software application being enlarged by entering a first mode in which touch-based interactions in one or more predetermined sub-regions at a perimeter of the touch-sensitive display are rejected.

An eighth aspect of the invention provides apparatus comprising:

means for causing display of content generated by a software application associated with the processor;

means for receiving signals indicative of touch inputs on a touch-sensitive display; and means for responding to detection of a content window provided by the software application being enlarged by entering a first mode in which touch-based interactions in one or more predetermined sub-regions at a perimeter of the touch-sensitive display are rejected.

BRIEF DESCRIPTION

Embodiments of the invention will now be described, by way of example only, with reference to the accompanying drawings, in which.

DETAILED DESCRIPTION

Figure 1:
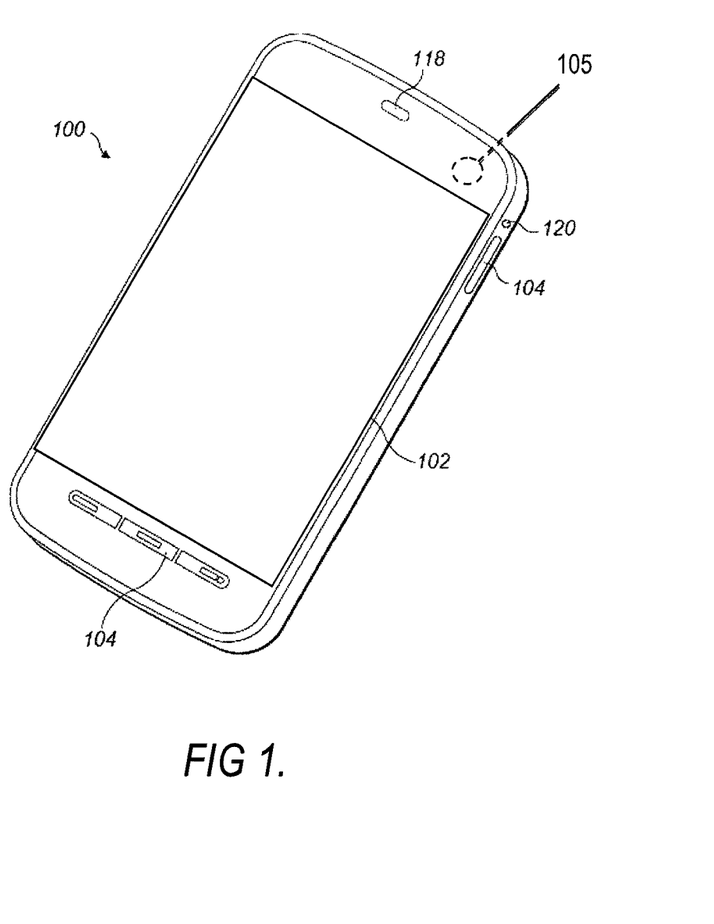
FIG. 1 is a perspective view of a mobile terminal embodying aspects of the invention.

Referring firstly to FIG. 1, a terminal 100 is shown. The exterior of the terminal 100 has a touch sensitive display 102, hardware keys 104, a speaker 118 and a headphone port 120.

Figure 2:
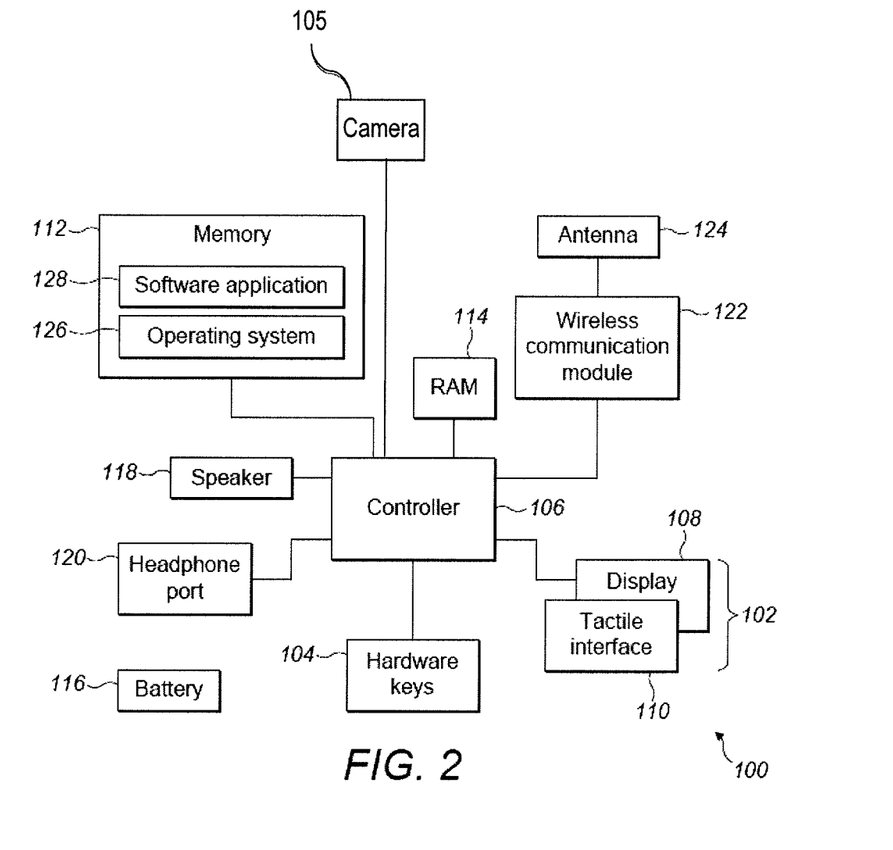
FIG. 2 is a schematic diagram illustrating components of the FIG. 1 mobile terminal and their interconnection.

FIG. 2 shows a schematic diagram of the components of terminal 100. The terminal 100 has a controller 106, a touch sensitive display 102 comprised of a display part 108 and a tactile interface part 110, the hardware keys 104, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may be a microcontroller, plural microcontrollers, a processor, or plural processors.

The terminal 100 may be a mobile telephone or smartphone, a personal digital assistant (PDA), a portable media player (PMP), a portable computer or any other device capable of running software applications and providing audio outputs. In some embodiments, the terminal 100 may engage in cellular communications using the wireless communications module 122 and the antenna 124. The wireless communications module 122 may be configured to communicate via several protocols such as GSM, CDMA, UMTS, Bluetooth and IEEE 802.11 (Wi-Fi).

The display part 108 of the touch sensitive display 102 is for displaying images and text to users of the terminal and the tactile interface part 110 is for receiving touch inputs from users.

As well as storing the operating system 126 and software applications 128, the memory 112 may also store multimedia files such as music and video files. A wide variety of software applications 128 may be installed on the terminal including web browsers, radio and music players, games and utility applications. Some or all of the software applications stored on the terminal may provide audio outputs. The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software applications not stored on the terminal. These may be applications stored on a remote server device and may run partly or exclusively on the remote server device. These applications can be termed cloud-hosted applications. The terminal 100 may be in communication with the remote server device in order to utilise the software application stored there. This may include receiving audio outputs provided by the external software application.

In some embodiments, the hardware keys 104 are dedicated volume control keys or switches. The hardware keys may for example comprise two adjacent keys, a single rocker switch or a rotary dial. In some embodiments, the hardware keys 104 are located on the side of the terminal 100.

Figure 3:
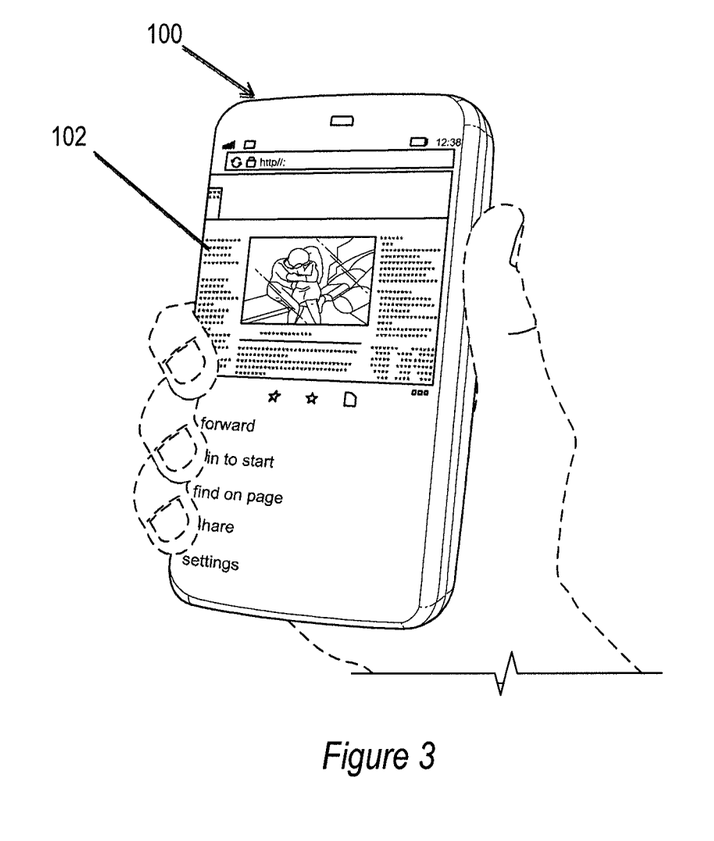
FIG. 3 is a perspective diagram showing a representation of the mobile terminal shown in FIG. 1 when held in the hand of a user.

As will be appreciated from FIG. 1, the terminal 100 is a thin-edge or thin-border type device in the sense that the touch-sensitive display (hereafter "display") 102 occupies almost all of the main, active, face of the terminal, leaving only a very narrow border of casing surrounding it. This being the case, the display 102 is easily touched by the user when picking the terminal 100 up, when retrieving it from a pocket or when it is gripped generally. This is indicated in the representative diagram shown in FIG. 3 which shows the terminal 100 gripped in a user's hand. If the entire display 102 is active all of the time, there is the likelihood of touch commands or gestures being inadvertently inputted to the operating system 126 or applications 128 running on the processor 106.

Figure 4:
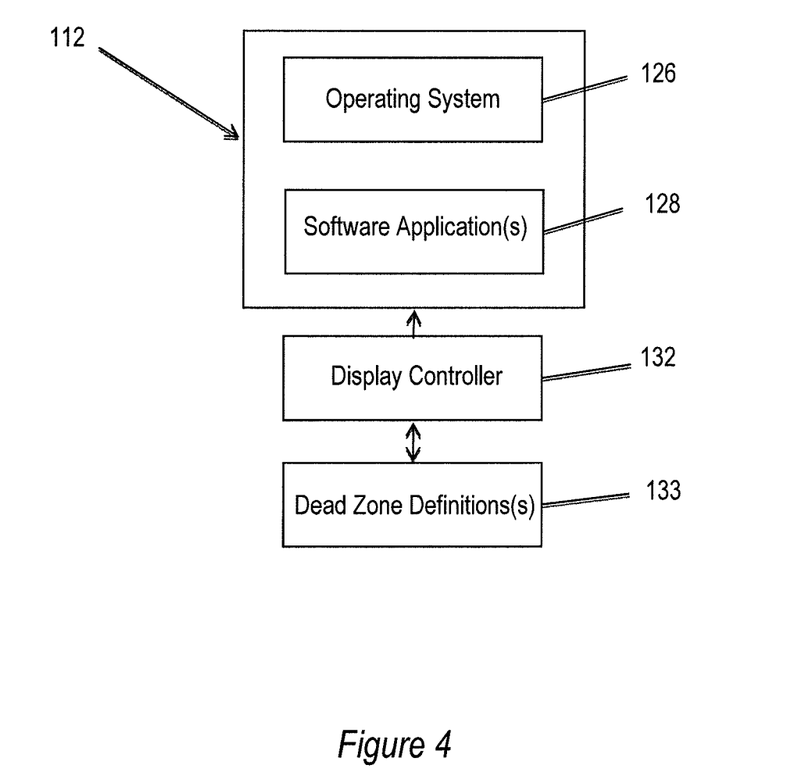
FIG. 4 is a block diagram showing the main operating modules providing user interaction control in accordance with embodiments of the invention.

To counter this, and referring now to FIG. 4, the terminal provides a display controller 132 which is operable, under certain conditions, to reject touch-based inputs made in certain region(s) of the display 102. Specifically, inputs made in such region(s) are not transferred to the application or applications 128 running on the processor 106. Such region(s) may be termed "dead zone(s)" for ease of reference, although "inactive zone" is an alternative term.

The display controller 132 is implemented in software. For instance, the display controller may be implemented as one or more modules forming part of the operating system 126. Alternatively, it may be provided as a software application that is external to the operating system 126 but is executed alongside and operates in conjunction with the operating system so as to operate as though it were part of the operating system. Here, other software applications may call on the display controller 132 so as to cause its functions to be effected. Alternatively, the display controller 132 is provided as a module that forms part of one or more software applications. In this way, software applications that include the display controller module 132 benefit from its functions and the other software applications do not so benefit.

The display controller 132 operates in association with a set of so-called dead zone definitions 133. The dead zone definitions are stored within the terminal, for instance in the display controller 132. The dead zone definitions define one or more dead zones. They are defined in terms of screen co-ordinates or pixel addresses. The dead zone definitions also define conditions in which the one or more dead zones are active or inactive. When the dead zones are active, the display controller 132 or the terminal 100 can be said to be in a first mode, and when the dead zones are inactive the display controller 132 or the terminal 100 can be said to be in a second mode.

In a first embodiment, the dead zone definitions 133 define that the or each dead zone is applied when the terminal 100 is woken from an idle state by an event triggered independently of user action, such as when a voice call is received over a wireless network, when a data message, e.g. an SMS message, is received over a wireless network, or when an internal time function such as a calendar appointment is notified to a user by software. In the context of this disclosure, the terminal 100 is in an idle state when the entire display 102 is inactive due to the terminal being locked or is in a sleep mode (which can be set by a user or occur automatically after a predetermined period of non-use).

Further, the dead zone definitions 133 define that the or each dead zone reverts to being an active part of the display 102, that is touch inputs are applied by the processor 106 to software applications 128 in the normal manner, following user action in the remaining, or active, region(s) of the display.

Figure 5:
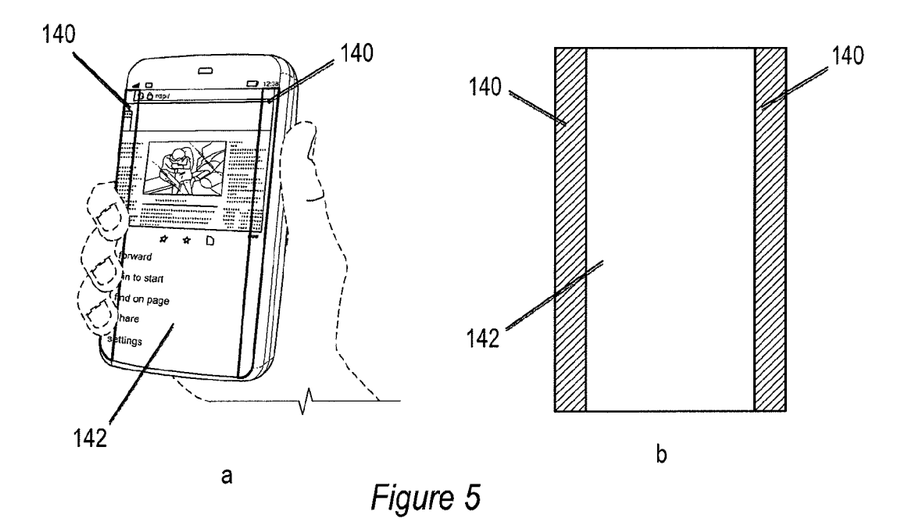
FIGS. 5a and 5b show, respectively, the mobile terminal of FIG. 3 with dead, or non-active screen zones, shown overlaid, and a plan view of the screen with said dead zones shown overlaid.
Figure 6:
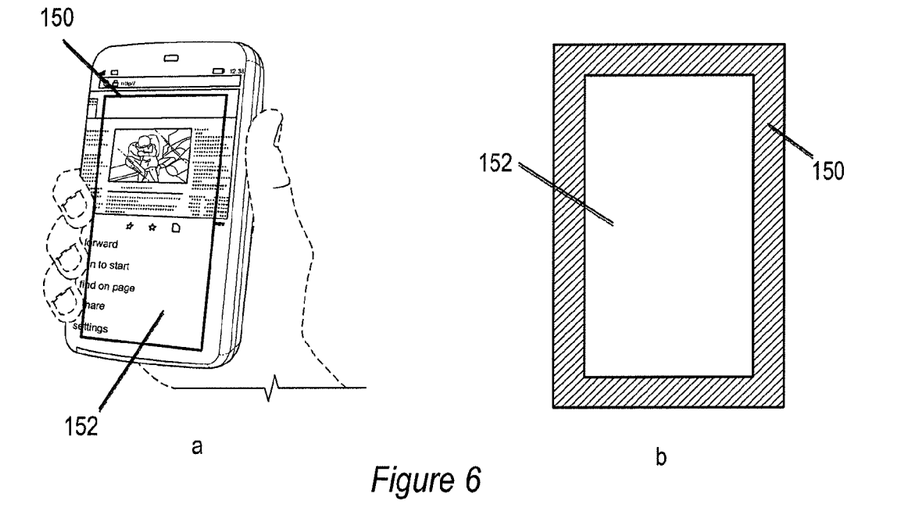
FIGS. 6a and 6b show, respectively, a further example of the mobile terminal of FIG. 3 with dead zones shown overlaid, and a plan view of the screen with said dead zones shown overlaid.

Referring to FIGS. 5 and 6, alternative definitions for the dead and active zones are indicated overlaid on the display 102. Referring to FIGS. 5a and 5b, first and second dead zones 140 are defined at the lengthwise (lateral) perimeter edges of the display 102, opposite one another. The region 142 between the opposed dead zones 140 is the active zone and touch inputs and gestures made in this active zone are applied by the display controller 132 to software applications 128 even though the dead zones do not. The dead zone definitions 133 define the pixel co-ordinates for the first and second dead zones 140.

Referring to FIGS. 6a and 6b, a single dead zone 150 is defined as a frame-like area adjacent the entire perimeter of the display 102 and surrounding an inner active zone 152.

It will be appreciated that the dead zone(s) indicated in FIGS. 5 and 6 correspond to the likely location of a user's fingers or palm when the terminal 100 is gripped during normal use.

Figure 7:
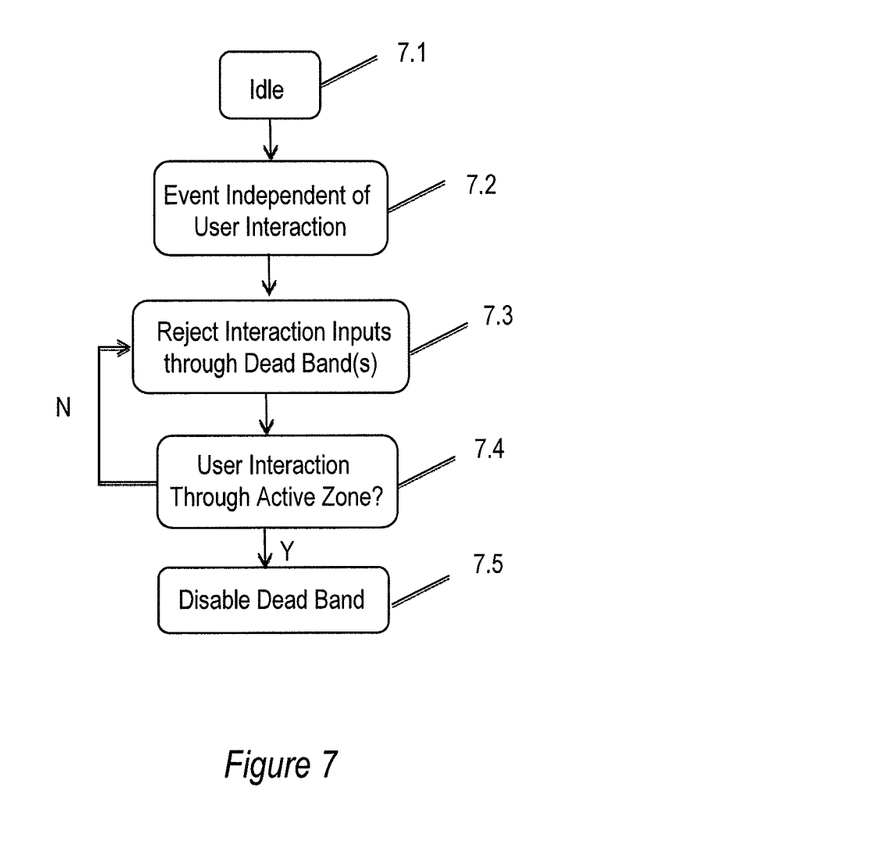
FIG. 7 is a flow diagram showing the main processing steps performed by a display controller as shown in FIG. 4 operating in a first embodiment.

Referring now to FIG. 7, the main processing steps applied by the display controller 132 are shown. In an initial step 7.1, the terminal 100 is assumed to be in an idle state. In a second step 7.2, the display controller 132 detects that the terminal 100 is woken from its idle state by an event triggered independent of user action, e.g. a phone call or SMS message received over a wireless network. In a subsequent step 7.3, the display controller 132 applies the dead zone definitions 133 such that inputs received in the dead zones 140, 150 of the display 102 are not transferred to control applications 128 running on the terminal 100. Touch inputs received in the active zone 142, 152 are transferred, however. In step 7.4, the display controller 132, in response to detecting touch inputs received in the active zone 142, 152, subsequently de-applies the dead zones 140, 150 such that touch inputs are transferred to control applications 128 running on the terminal 100, i.e. step 7.5. Otherwise, the dead zones 140, 150 remain.

The dead zone definitions 133 may define that a predetermined number and/or sequence of touch inputs are required in the active zone 142, 152 to de-apply the dead zones 140, 150, i.e. enter step 7.5.

In a second embodiment, the dead zone definitions 133 define that the or each dead zone is/are applied when a user-interface window associated with an application 128 running on the terminal 100 is enlarged, either by user action or automatically by software control.

Figure 8:
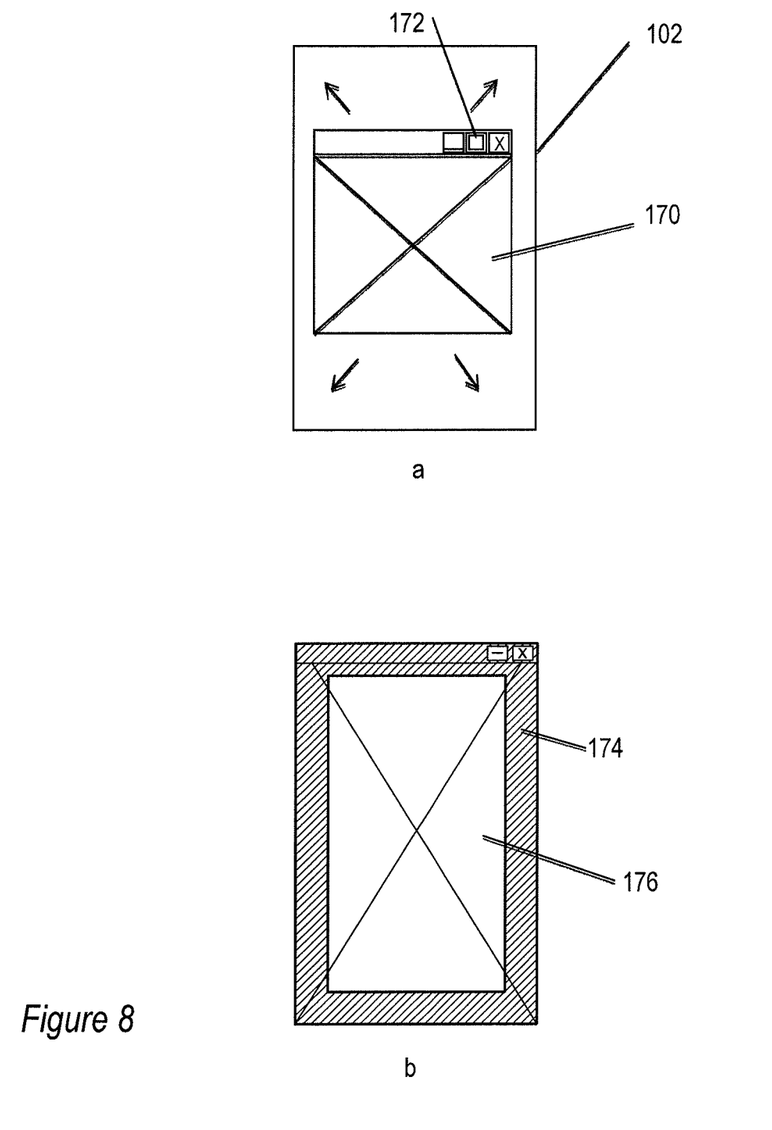
FIGS. 8a and 8b show the screen of the mobile terminal shown in FIG. 3, with an application window shows, respectively, at a normal size and at an enlarged size which is useful for understanding a second embodiment.

For example, as shown in FIGS. 8a and 8b, when a user is operating the terminal 100 by touch inputs made to the display 102, they may enlarge, or as in the case of FIG. 8, maximise an application window 170 on the terminal 100 usually by means of a one-touch input to a dedicated area 172 of that window. This causes the window 170 to enlarge automatically to occupy substantially the entire area of the display 102. In this situation, it is possible that unintentional inputs may be applied to the relevant application 128 due to the user holding the terminal 100 in the manner shown in FIG. 3. If the application 128 is an interne browser, for example, the user may accidentally activate a hyperlink after maximising the browser window. If the application 128 is a shopping list application, the user may accidentally select an item on the shopping list for editing or deletion. The application of one or more dead zone(s) 174 by the display controller 132 can reduce the chances of this occurring.

Subsequently, user interaction in the active zone 176 is detected by the display controller 132 and the dead-zone(s) 174 de-applied to make the entire display active to receive user inputs for controlling the application.

Figure 9:
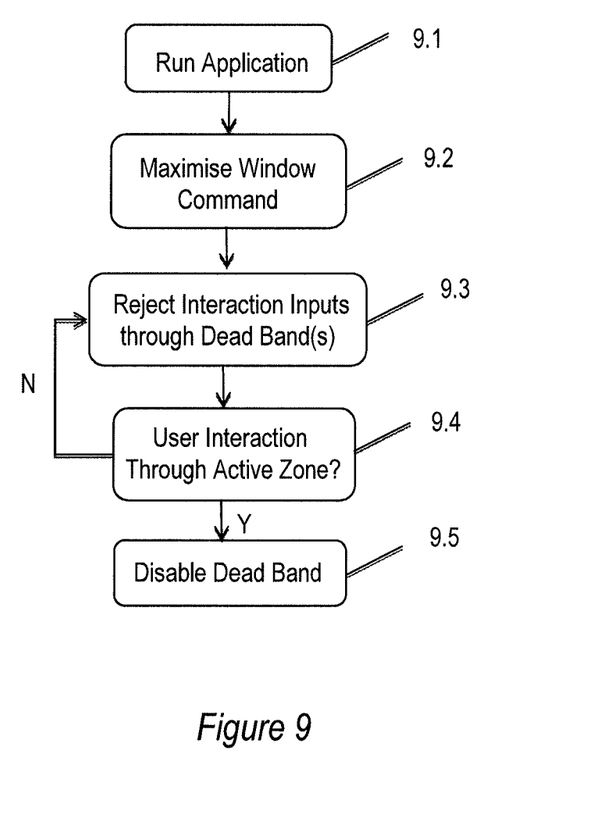
FIG. 9 is a flow diagram showing the main processing steps performed by a display controller as shown in FIG. 4 operating in a second embodiment.

Referring now to FIG. 9, the main processing steps applied by the display controller 132 in this second embodiment are shown. In an initial step 9.1, the display controller 132 detects that an application is being run and presents on the display 102 a window. In a second step 9.2, the display controller 132 detects that a touch input to enlarge or maximise the window has been made. In a subsequent step 9.3, the display controller 132 applies the dead zone definitions 133 such that inputs received in the dead zones 140, 150 of the display 102 are not transferred to control the application 128 running on the terminal 100. Touch inputs received in the active zone 142, 152 are transferred, however. In step 9.4, the display controller 132, in response to detecting touch inputs received in the active zone 142, 152, subsequently de-applies the dead zones 140, 150 such that touch inputs are transferred to control the application 128 running on the terminal 100, i.e. step 9.5. Otherwise, the dead zones 140, 150 remain.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Apparatus comprising at least one processor and at least one memory having computer-readable code stored thereon which when executed controls the at least one processor:
   to cause display of content generated by a software application associated with the processor;
   to receive signals indicative of touch inputs on a touch-sensitive display; and
   to respond to detection of a content window provided by the software application being enlarged by entering a first mode in which touch-based interactions in one or more predetermined sub-regions at a perimeter of the touch-sensitive display are rejected.

2. Apparatus according to claim 1, wherein the computer code when executed controls the processor to reject interactions in said one or more perimeter sub-regions in response to a user interface window associated with the application being enlarged in accordance with a maximise command.

3. Apparatus according to claim 1, wherein the software application is configured to control the processor to enlarge the window in response to one or more received touch inputs.

4. Apparatus according to claim 1, wherein the computer code when executed controls the processor to be responsive to interactions in said one or more perimeter sub-regions in response to a predetermined event.

5. Apparatus according to claim 4, wherein the computer code when executed controls the processor to be responsive to interactions in said perimeter sub-region(s) in response to user interactions made outside of said one or more perimeter sub-regions, and optionally wherein the computer code when executed controls the processor to be responsive to interactions are subsequently accepted in response to user interactions made through the touch-sensitive display outside of said one or more perimeter sub-regions.

6. Apparatus according to claim 1, wherein the display is elongate having opposed lengthwise edges and widthways edges, and the one or more perimeter sub-regions comprise first and second separate sub-regions located on lengthwise, opposite perimeters of the touch-sensitive display.

7. Apparatus according to claim 1, wherein the apparatus is a mobile communications terminal.

8. A method comprising:
   causing display of content generated by a software application associated with the processor;
   receiving signals indicative of touch inputs on a touch-sensitive display; and
   responding to detection of a content window provided by the software application being enlarged by entering a first mode in which touch-based interactions in one or more predetermined sub-regions at a perimeter of the touch-sensitive display are rejected.

9. A non-transitory computer-readable storage medium having stored thereon computer-readable code, which, when executed by computing apparatus, causes the computing apparatus to perform a method comprising:
   causing display of content generated by a software application associated with the processor;
   receiving signals indicative of touch inputs on a touch-sensitive display; and
   responding to detection of a content window provided by the software application being enlarged by entering a first mode in which touch-based interactions in one or more predetermined sub-regions at a perimeter of the touch-sensitive display are rejected.

* * * * *